US009846621B1

(12) United States Patent
Mirkhelkar et al.

(10) Patent No.: US 9,846,621 B1
(45) Date of Patent: Dec. 19, 2017

(54) DISASTER RECOVERY—MULTIPLE RESTORE OPTIONS AND AUTOMATIC MANAGEMENT OF RESTORED COMPUTING DEVICES

(71) Applicant: Western Digital Technologies, Inc., Irvine, CA (US)

(72) Inventors: Rajesh Mirkhelkar, Milpitas, CA (US); Gabriel Ribeiro, San Francisco, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 56 days.

(21) Appl. No.: 14/752,249

(22) Filed: Jun. 26, 2015

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 11/1464* (2013.01); *G06F 2201/84* (2013.01)

(58) Field of Classification Search
CPC .................................................. G06F 11/1453
USPC ....................................... 714/15, 16, 10–13
See application file for complete search history.

(56) References Cited

U.S. PATENT DOCUMENTS

| | | | |
|---|---|---|---|
| 5,819,020 A * | 10/1998 | Beeler, Jr. ........... | G06F 11/2071 707/999.202 |
| 6,499,054 B1 | 12/2002 | Hesselink et al. | |
| 6,732,158 B1 | 5/2004 | Hesselink et al. | |
| 7,051,052 B1 * | 5/2006 | Shapiro ............... | G06F 11/2071 707/610 |
| 7,093,086 B1 * | 8/2006 | van Rietschote ... | G06F 11/1438 711/161 |
| 7,120,692 B2 | 10/2006 | Hesselink et al. | |
| 7,346,799 B2 | 3/2008 | Uhlmann et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |

(Continued)

OTHER PUBLICATIONS

Rajesh Mirkhelkar, U.S. Appl. No. 14/582,983, filed Dec. 24, 2014, 15 pages.

(Continued)

*Primary Examiner* — Dieu-Minh Le
(74) *Attorney, Agent, or Firm* — Chang & Hale LLP

(57) ABSTRACT

A computer-implemented method may comprise performing a disaster recovery restore process on a target computing device; accessing a backup server; and selecting a source backup from the backup server. The source backup may comprise one or more volumes, partitions, files and device drivers of a source computing device from which the source backup was created. The selected source backup may then be installed in an offline partition of the target computing device. One or more target device drivers may then be installed in the offline partition. To complete the disaster recovery restore process on the target computing device, the target computing device may then be rebooted. Both the backup of the source computing device and the active partition of the target device may comprise source computing device-dependent hardware device drivers. When carried out in a Windows® environment, Sysprep need not be used and the kernel need not be modified.

26 Claims, 3 Drawing Sheets

(56) References Cited

U.S. PATENT DOCUMENTS

| | | | |
|---|---|---|---|
| 7,788,404 B2 | 8/2010 | Hesselink et al. | |
| 7,840,963 B2 * | 11/2010 | Traut | G06F 11/1438 711/161 |
| 7,844,853 B2 * | 11/2010 | Barsness | G06F 11/1438 714/19 |
| 7,917,628 B2 | 3/2011 | Hesselink et al. | |
| 7,934,119 B2 * | 4/2011 | Takamoto | G06F 11/2028 714/15 |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,255,661 B2 | 8/2012 | Karr et al. | |
| 8,260,747 B2 | 9/2012 | Wu et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |
| 8,489,552 B1 | 7/2013 | Dowers, II et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,832,030 B1 | 9/2014 | Buchman et al. | |
| 8,843,450 B1 | 9/2014 | Shioyama et al. | |
| 8,856,293 B1 | 10/2014 | Sadry | |
| 9,189,345 B1 * | 11/2015 | Khanduja | G06F 11/1464 |
| 2005/0144195 A1 | 6/2005 | Hesselink et al. | |
| 2005/0144200 A1 | 6/2005 | Hesselink et al. | |
| 2012/0036041 A1 | 2/2012 | Hesselink | |
| 2013/0124807 A1 * | 5/2013 | Nielsen | G06F 11/1438 711/162 |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2014/0095439 A1 | 4/2014 | Ram | |
| 2014/0169921 A1 | 6/2014 | Carey | |
| 2014/0173215 A1 | 6/2014 | Lin et al. | |

OTHER PUBLICATIONS

Clonezilla—About, http://www.clonezilla.org/,downloaded on Sep. 16, 2015, pp. 1-3.

DRBL-Winroll—A MS-Windows extension tool, http://www.drbl-winroll.org/, downloaded on Sep. 16, 2015, pp. 1-6.

Hyper-V Replica, /https://technet.microsoft.com/en-us/library/jj134172.aspx, downloaded on Sep. 16, 2015, pp. 1-3.

NovaBACKUP, Backup Software for Windows Servers & PC's, http://novabackup.novastor.com/, downloaded on Sep. 16, 2015, pp. 1-10.

* cited by examiner

DISASTER RECOVERY—MULTIPLE RESTORE OPTIONS AND AUTOMATIC MANAGEMENT OF RESTORED COMPUTING DEVICES

BACKGROUND

Embodiments are related to the recovery of user data, metadata, system configuration and operating system from a failed computing device or from a device of which a clone computing device is to be configured. Such recovery is referred to as "Disaster Recovery".

DETAILED DESCRIPTION

Figure 1:
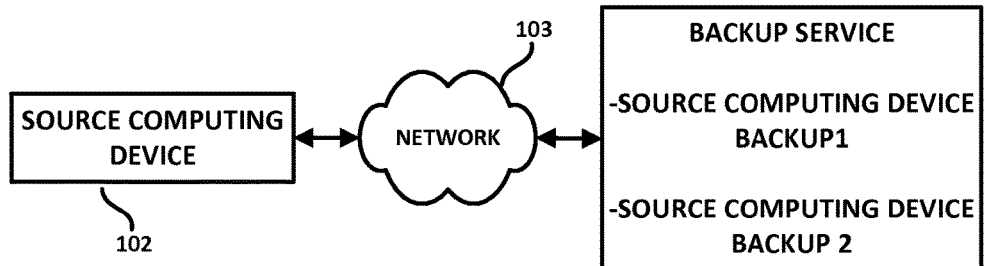
FIG. 1 is a block diagram of a source computing device and a backup service accessed over a computer network.
Figure 2:
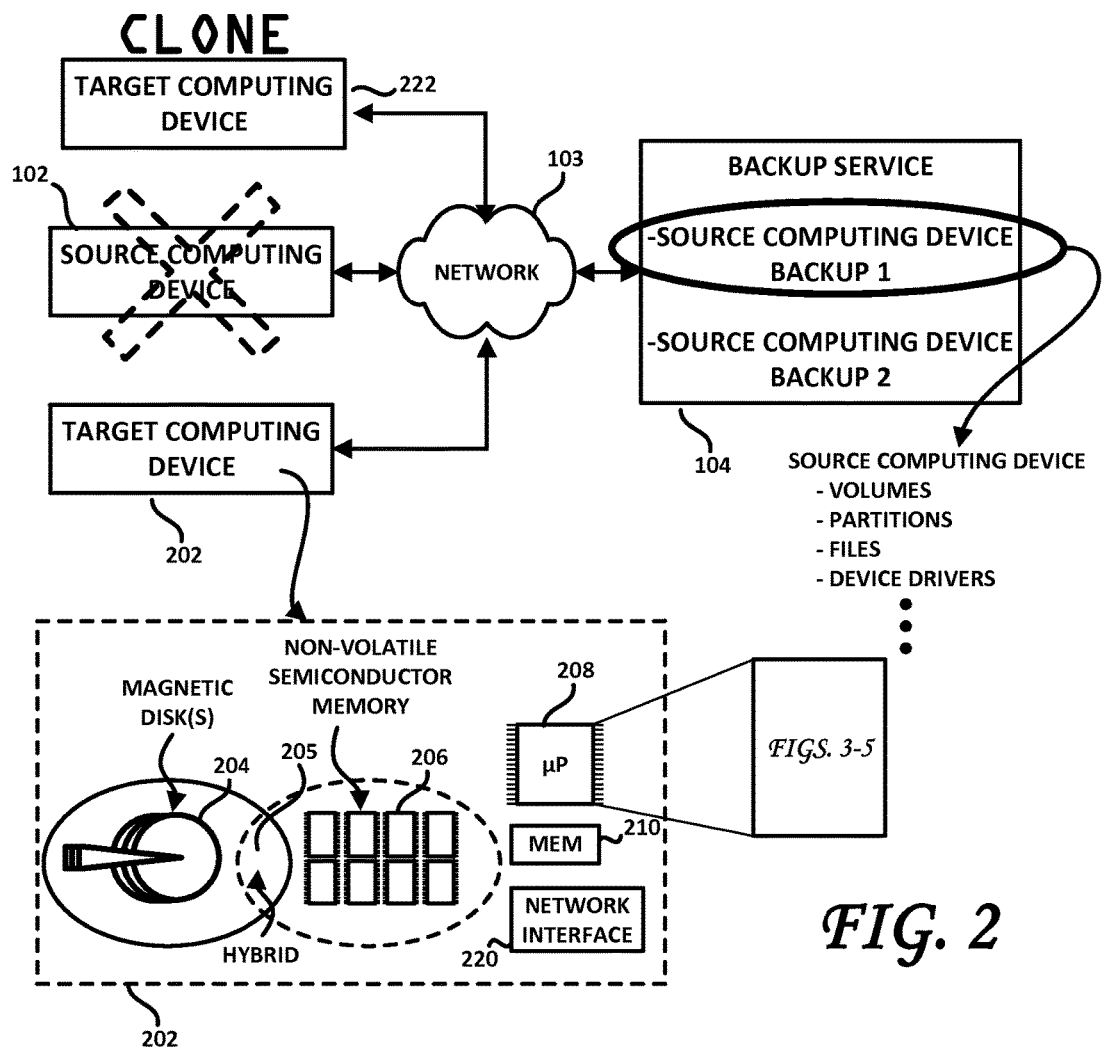
FIG. 2 is a block diagram illustrating aspects of one embodiment.

FIG. 1 shows a source computing device 102 and a backup service 104. The source computing device 102 may access the backup service 104 over a computer network 103 including, for example, the Internet and/or some other private network. Disaster Recovery (hereafter, "DR") refers to the process of recovering user volumes, metadata, system configuration and the entire operating system from a backup-up source computing device to a target computing device. DR may be carried out when the source computing device has been destroyed or otherwise rendered inoperable or inaccessible and when it is desired to restore all user data, metadata and system configuration to a target computing device in such a manner that the target computing device may be used as a drop-in replacement for the destroyed, inoperative or inaccessible source computing device. DR may also be carried out when it is desired to clone (i.e., make an identical or near-identical copy of) another computing device. FIG. 2 is a block diagram of a source computing device and a backup service accessed over a computer network 103. In FIG. 2, in one scenario, according to one embodiment, the source computing device 102 may have been subjected to some event that renders it inoperable, as suggested by the large "X". A target computing device 202 may then be provided as a replacement, which target computing device is to be configured according to a selected source backup stored in the backup service 104. In the illustrative example of FIG. 2, the selected source computing device backup is source computing device backup 1.

In another scenario, according to one embodiment, the source computing device 102 may be undamaged and fully functional. Instead of recovering user data, volumes, operating system and device configuration information from a damaged or otherwise inoperative computing device, it may be desired to load such information onto another computing device, thereby enabling both source computing device and substantially identical target computing device on, for example, the same network. Such a substantially identical target computing device may also be called a "clone", as suggested at reference numeral 222 in FIG. 2. As in the DR case of target computing device 202, the user data, volumes, operating system and device configuration information used to configured the clone computing device may be fetched from the source computing device backup 1 or 2 stored in the backup service 104.

The target computing device 202 or 222 may be identical to the now-inoperable source computing device 102, but that need not be the case. Indeed, there are instances in which the target computing device 202 or 222 may be dissimilar, at least in term of device drivers and hardware, relative to the source computing device 102. For example, whereas, the source computing device 102 may be a desktop computer, the target computing device 202 or 222 may be a laptop computer, a tablet, a server or even a similar computing device with, for example, a different motherboard or enterprise-level storage. A representative target computing device 202 or 222 is shown in FIG. 2. For example, a target computing device 202 or 222 may be configured to carry out all or a portion of the functionality described herein and may comprise a microprocessor or controller 208, memory 210 and a network interface 220 configured to couple the target computing device 202 or 222 to network 103 and/or other external devices (e.g., external storage that is not cloned or otherwise a party to the disaster recovery restore process) through communication ports. Some external devices may not be affected by whatever disaster that befell the source computing device. Such external devices may include, for example, Storage Area Networks (SAN), Network Attached Storage (NAS), Redundant Array of Inexpensive Disks (RAID) and the like. Examination of the metadata in the source computing device backup may reveal those external devices that were likely not affected and, therefore, need not be restored to an earlier state.

The target computing device 202 may also include mass storage. The mass storage, according to one embodiment, may comprise a Hard Disk Drive (HDD) comprising one or more rotating magnetic disks 204. The mass storage of target computing device 202 may also comprise non-volatile (e.g., Flash-based) memories 206. Alternatively still, the mass storage of target computing device 202 may comprise one or more hybrid storage devices 205, each comprising both magnetic disks 204 and non-volatile semiconductor memory 206. As also shown in FIG. 2, the microprocessor 208, coupled to the mass storage, the memory 210 and to the network interface 220, may be configured to execute instructions configured to implement the embodiments shown relative to FIG. 3 and described herein.

As suggested in FIG. 2, each of the backups, shown in FIG. 2 as source computing device backup 1 and backup 2, may comprise both system information and user data. For example, each backup of the source computing device stored in backup service 104 may comprise, among other items, volumes, partitions, user files and hardware device drivers of the source computing device 102. This presents problems in term of, amongst other issues, software drivers and other hardware-dependent software. Indeed, drivers that may have been designed to control hardware on the source computing device 102 may not be operative to control the dissimilar hardware on the target computing device 202, 222.

In a Microsoft Windows® environment, disk images are often used to perform DR backups on both similar and dissimilar hardware. Disk images are computer files containing the contents and structure of a disk volume or an entire data storage device, such as a hard drive, tape drive, floppy disk, optical disc or USB flash drive. A disk image is usually created by creating a sector-by-sector copy of the source medium, thereby perfectly replicating the structure and contents of a storage device independently of the file system. Depending on the disk image format, a disk image may span one or more computer files. Conventionally, the same image may be used during restoration of the user data, metadata and configuration onto a different (target) computing device.

In order for the restore to work on dissimilar hardware as well, before the disk image is taken, a windows tool called Sysprep is run, to clean the system of any device/hardware-specific information. Sysprep was originally introduced for use with Windows NT 4.0. Later versions introduced for Windows 2000 and Windows XP, available for download from Microsoft, were included in the Windows CD. Windows Vista marks the first version of Microsoft's NT operating system to include a Hardware Abstraction Layer (HAL) independent version of Sysprep in the "out of box" installation. Hardware abstractions are sets of routines in software that emulate platform-specific details, giving programs direct access to the hardware resources. Such abstraction layers allow programmers to write device-independent, high performance applications by providing standard OS calls to hardware. Sysprep can be used to prepare an operating system for disk cloning and restoration via a disk image. Windows operating system installations include many unique software elements per installation that must be "generalized" before capturing and deploying a disk image to one or more target computers. Such unique software elements include driver software. The Sysprep tool removes all the drivers removed from the image before the image is taken, as the drivers in the disk image may not be appropriate for the specific hardware of the target computer. During restore, multiple iterations are typically performed between reboots, to add the target hardware drivers. The requirement to use Sysprep and the need for multiple reboots to restore a source computing device onto a potentially dissimilar target computing device constitutes a significant technological problem.

One embodiment, therefore, is a technological solution to this technological problem. Backup of all DR-related data of a source computing device, which may comprise system information, Operating System (OS) data and user volumes and partitions, may be carried out at a volume and file level on both Basic Input/Output System (BIOS) and Unified Extensible Firmware Interface (UEFI) to a backup service or server. As this backup may include the entire system information of the source computing device, the source computing device's hardware device drivers may be backed up as well. It should be noted here that not all of the hardware device drivers of the source computing device may be relevant to the target computing device, as the hardware configurations thereof may be dissimilar. That is, the target computing devices (the computing devices on which the DR restore process is to be performed) may not comprise all of the hardware for which the hardware device drivers of the source computer were designed.

At restore time, a disaster recovery process is initiated in which the backup of the source computing device is restored onto the target computing device, which target computing device may comprise new or dissimilar hardware; that is, hardware that was not present on the source computing device from which the source backup was created. This restore process also restores the entire system information, including the hardware device drivers of the source computing device, which might or might not be relevant on the target computing device, according to one embodiment. The restoration may be carried out, according to one embodiment, in an offline boot partition and OS partitions, which resides in a different volume than the active OS partition. As one embodiment may be carried out in a Microsoft Windows® environment, the system information, including the hardware device drivers of the source computing device may be restored in a Windows boot partition. Indeed, at this stage of the disaster recovery process, the Windows® PE operating system is running from a temporary boot partition created by booting the target computing device using the Win PE OS. A Volume Shadow Copy Service (VSS) backup-and-recovery application that performs disaster recovery (also called bare-metal recovery) can use the Automated System Recovery (ASR) writer together with Windows Pre-installation Environment (Windows PE) to back up and restore critical volumes and other components of the bootable system state. The temporary boot partition created by the Windows PE operating system is stored in the target computing device's random access memory (RAM). The partition to which the restore process restores the system information, device drivers and files from the source computing device is an offline partition, stored in non-volatile memory, such as a hard disk drive (HDD) or semiconductor memory, such as a Flash-based mass storage device.

According to one embodiment, the target computing device may then retrieve one or more target device drivers from a predetermined location. That is, the user may then be provided with the option of providing the locations of the target device drivers. Such a location may be, for example, a CD placed in a CD ROM drive in the target computing device. The hardware device drivers of the target computing device may then be retrieved from the predetermined location and loaded and installed into the offline partition. The offline partition, at this stage, comprises the volumes, system information and user files of the source computing device, together with any target computing device-specific device drivers that may have been loaded. This system information may comprise one or more hardware device drivers of the source computing device, irrespective of whether such source computing device-originated hardware device drivers are relevant or indeed useful in the target computing device. To complete the disaster recovery process, according to one embodiment, the target computing device may then be rebooted.

In a Windows® environment, upon reboot, the Windows Plug and Play mechanism may automatically choose the right drivers based on their ranking. Indeed, some devices of the target computing device may require a vendor-supplied driver that is designed specifically for that device or one that is designed to support a family of devices. However, other devices of the target computing device may be driven by a system-supplied driver that supports all the devices of a given device setup class. In a Windows® environment, the OS may be configured to select the driver that most closely matches the device. If Windows® does not find such a driver, it may select from increasingly more general drivers, based on their ranking. Such a ranking may be carried out by creating a list of all matching drivers and assigning each matching driver a rank, which may comprise an integer whose value is greater than or equal to zero This allows the co-existence of both the source machine drivers, and the new, target drivers.

In Windows® 7 and above, one embodiment leverages automatic appropriate HAL selection (Windows Vista and above) and appropriate driver selection using the driver ranking process of the Plug and Play mechanism to select the hardware device drivers to be installed in the offline partition and, thereafter, in the active (e.g., boot) partition, which is the partition that holds the boot sector containing the OS and that contains the boot loader and the software responsible for booting the OS. The kernel, therefore, need not be modified as the appropriate HAL is selected by the operating system.

Figure 3:
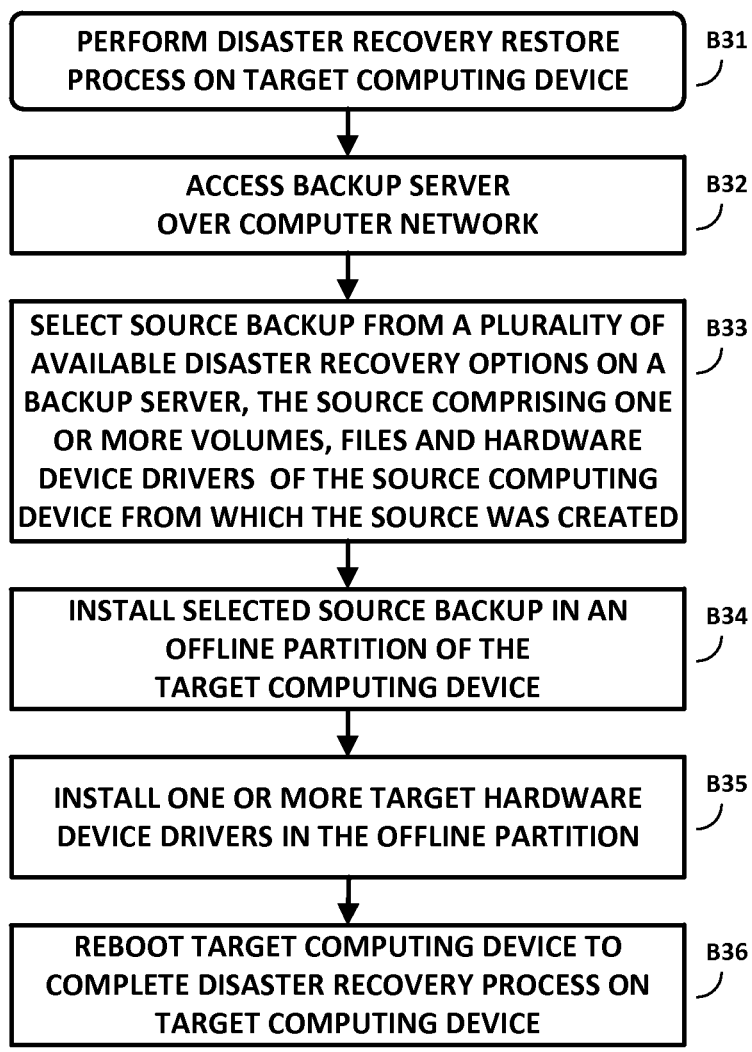
FIG. 3 is a flowchart of a method according to one embodiment.

As shown in the flowchart of FIG. 3, block B31 calls for performing a disaster recovery restore process on a target computing device. As shown at B32, a backup server, as shown at 104 in FIGS. 1 and 2, may be accessed over a computer network, as shown at 103. In B33, a source backup may be selected from a plurality of disaster recovery options on the backup server 104 (by reference for example, to a timestamp or other indicator). The source backup may comprise, for example, one or more volumes, partitions, files and hardware device drivers of the source computing device from which the source backup was created. As shown at B34, the selected source backup may then be installed in an offline partition of the target computing device, to recreate the partitions, and volumes, user data, hardware device drivers and the like of the source computing device on the target computing device. A device driver or drivers specific to the target hardware device driver may then be installed in the offline partition, as shown at B35. Lastly, the target computing device may then be rebooted to complete the disaster recovery process on the target computing device, as called for by B36.

According to one embodiment, rebooting the target computing device, as shown in B36, may configure the offline partition into an active, boot partition. Installing the device driver or drivers specific to the target computing device may comprise retrieving the target device driver(s) from a predetermined location such as, for example, a location on the network or a data carrier such as a USB drive or a CD inserted into the target computing device's CD tray. The target computing device may comprise and be configured to run an operating systems such as a version of Microsoft Windows® 7 or above.

According to one embodiment, the target computing device, after having rebooted, still comprises the device driver(s) of the source computing device, although one or more of these may not be active or operative to control or operate any hardware on the target computing device. Stated differently, the device driver(s) (e.g., SAS or SATA drivers) of the source computing device may be left in the selected source backup when the selected source backup (such as source computing device backup 1 shown in FIG. 2) is installed in the offline partition of the target computing device. Therefore, completing the disaster recovery process on the target computing device may be carried out without executing Microsoft Sysprep, whose purpose includes the removal of device-specific hardware device drivers.

When implemented in a Windows® environment, for example, rebooting target computing devices implementing Windows® 8 and above may comprise rebooting the target computing device a single time to complete the disaster recovery restore process. For a target computing device running a version of Windows® 7 (Vista), rebooting may be carried out twice to complete the disaster recovery restore process. According to one embodiment, the restore process may be carried out without requiring selection of a Hardware Abstraction Layer (HAL).

Another embodiment is a machine-readable medium having data stored thereon representing sequences of instructions which, when executed by a computing device, causes the computing device to perform a disaster recovery restore process on a target computing device as described and shown herein.

As the hardware device drivers of the source computing device may be, according to one embodiment, ported over the offline partition and thereafter to the target computing device's active boot partition, no Sysprep need be run on the source backup, as the backup source need not be cleaned of all hardware-dependent device drivers. Not having to rid the source backup of hardware dependent device drivers can save hours of backup time and significantly decrease the computation resources expended at the source computing device. From a disaster recovery restore operation point of view, fewer reboots may be necessary to load the offline partition as the active partition and to fully configure the target computing device to an operational state. Fewer reboots may be necessary as the hardware device drivers for the target computing device are installed at the same time that the target computing device is being restored from the source backup. In a Windows® environment, a single reboot may be sufficient to complete the disaster recovery restore process. For Windows 7 operating systems, only two reboots may be required.

According to one embodiment, the restore process may be carried out such that the restored target computing device has the same hosting parameters (including, for example, host name) and the same Internet Protocol (IP) address as the inoperative source computing device did (the source computing device may be inoperable). In this manner, as the restored target computing device is brought online, it may be identified and behave just like the source computing device.

Generally, only one option is presented to the user wishing to recover, for DR purposes, an exact copy of the original, source computing device (including its hostname and IP Address). In fact, existing DR solutions assume that the source computing device is not recoverable and no longer on the same network. Otherwise, if a user were to use this DR approach to somehow clone an existing and operative source computing device on the network to a new computing device, this approach would fail. Indeed, after the DR restore is completed, both the source computing device computer and the clone of the source computing device would be on the network at the same time, and both computing devices would be configured with the same host-name and IP address, leading to unwanted collisions.

If, however, if the user of an existing DR solution wanted to restore using a different host-name or IP address, for versioning purposes, such an operation could not be carried out at restore time. To achieve this, a user would have to remove the source computing device from the list of machines being backed up from the backup server, and then reconfigure the restored computer, re-register the restored machine with the new host-name or IP address (as the case maybe) with the backup server. Alternatively, if the user of an existing DR solution wanted to clone a new computing device, and at the same time, have the new clone computer be automatically registered and managed for backup with the backup server, such could also not be carried out at restore time. In this case also, post-restore, the user would need to register the new clone computing device with the backup server for backup purposes.

According to one embodiment, the target computing device may be restored and selectively given a different name, hosting service and/or IP address. This may preserve the backup of the source computing device, should it be desired to roll back to that version at some future date. Restoring a computing device with user-selectable name, hosting service and/or IP address may be useful, for example, in the case in which the source computing device is still operable and is still coupled to the network.

According to one embodiment, backup of all DR-related data (including, for example, system information, OS, data, user volumes) may be carried out at a volume level (on both Basic Input/Output System (BIOS) and Unified Extensible Firmware Interface (UEFI) firmware interfaces) to a backup server or service, such as shown at 104 in FIGS. 1 and 2. At restore time, according to one embodiment, the user may be presented with different ways of restoring the source computing device. According to one embodiment, the user may be presented with, and be given the opportunity to choose, one of the following:

1) Perform a DR of the source computing device to a target computing device as the original computer using the same hostname and IP address as the source computing device and cause the restored target computer become automatically managed by the backup server or service, at least for backup purposes, in the same manner as the source computing device had been managed by the backup server or service before the event giving rise to the need for disaster recovery.

2) Perform a DR of the original computer, but change the host-name of the original computer to a different name, and have the computer managed by the backup server (for backup purposes) with the new host-name, automatically at restore time.

3) Perform a DR of the original computer, but change the IP Address of the original computer to a different IP, and have the computer managed by the backup server (for backup purposes) with the new IP Address, automatically at restore time.

4) Perform a clone of the original computer, with the clone an almost exact copy of the original computer, except with a new host-name and IP address, and automatically have the computer be managed by the backup server (for backup purposes) with the new name/IP.

Figure 4:
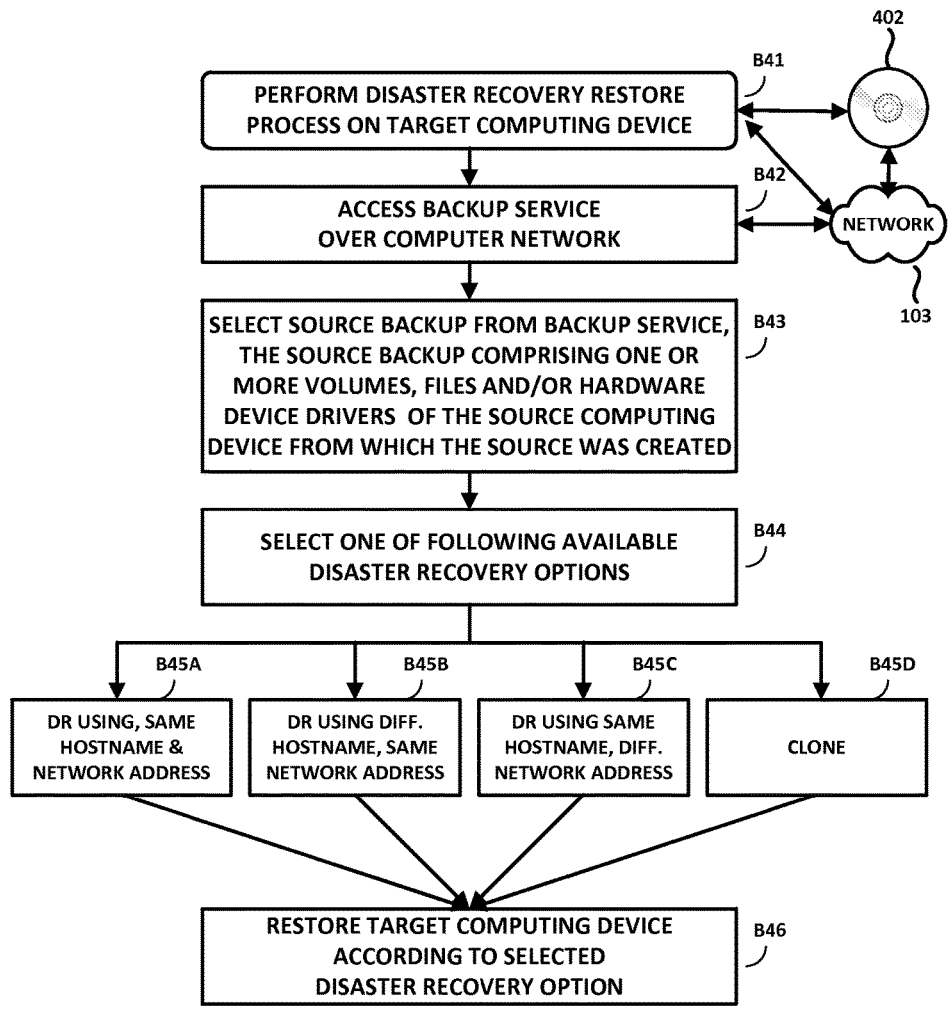
FIG. 4 is a flowchart of a method according to one embodiment.

FIG. 4 is a flowchart of a method according to one embodiment. As suggested at 402, the method may be encoded data representing sequences of instructions that are stored in a tangible, non-transitory machine-readable medium. The stored sequences instructions may cause a computing device to access network 103 to access a backup service, as shown at 104 in FIGS. 1 and 2. The sequences of instructions, when executed by the computing device, may cause the computing device to perform a disaster recovery restore process on a target computing device, as called for by block B41 in FIG. 4. As shown at B42, the computing device may then be caused to access the backup service 104 over computer network 103. As shown at B43, the computing device may then select, either programmatically or through user input, a source backup from the backup service 104. The source backup may, as shown at B43, comprise one or more volumes, files and/or hardware device drives of the source computing device from which the source was created. A DR option may then be selected, as shown at B44. According to one embodiment, the available options may include, without limitation, a DR using the same hostname and network address as shown at B45A, DR using a different hostname but the same network address as shown at B45B, DR using the same hostname and a different network address, as shown at B45C or a clone, as shown at B45D. Carrying out a DR using the same hostname and network address may be appropriate when it is desired to create a drop-in replacement for the damaged or destroyed device. Carrying out a DR using a different hostname and network address may be appropriate for versioning purposes or when it is desired to create a drop-in replacement for the damaged or destroyed device while differentiating recovered computing device from the damaged or destroyed one. Carrying out a DR using the same hostname and a different network address may also be appropriate for versioning purposes and/or when it is desired to create a drop-in replacement for the damaged or destroyed device but at a different network address. Lastly, carrying out a DR using a different hostname and a different network address may be appropriate when it is desired to add a new device to the network that is a clone or functionally identical (or nearly so) to another computing device on the network at another network address. Such may be useful, for example, when adding a new team member to on on-going project and providing this new team member with the same processing resources as are available to other members of the team. For example, when carrying out a DR such that the recovered device is at a different network address, a Dynamic Host Configuration Protocol (DHCP) server may be called, to automatically set up, for example, the IP-address of its interface, the IP-address of at least one domain name server, and the IP-address of a server in the LAN that serves as a router to the internet. The hostname may be changed via input from the user or programmatically, to differentiate the new hostname from the old hostname. Other options are possible and are expressly included within the scope of this disclosure. The target computing device may then be restored according to the selected disaster recovery option, as called for by block B46.

One embodiment is a system for performing a disaster recovery restore process on a target computing device. Such a system may comprise a processor, memory and an interface. The memory may be coupled to the processor, and may be configured to store a plurality of source backups, each including a volume of a source computing device from which the source backup was created and/or the source computing device being associated with a first hostname and first Internet Protocol (IP) address. The interface may be coupled to the processor and may be configured to receive, from a target computing device over a computer network, a selected one of a plurality of available disaster recovery options. In one implementation, plurality of available disaster recovery options may include 1) restoring a target computing device using the selected source backup and configure the target computing device with the first hostname and the first network address;

2) restoring the target computing device using the selected source backup and configuring the target computing device with the first hostname and a second network address that is different from the first network address;

3) restoring the target computing device using the selected source backup and configuring the target computing device with the first network address and a second hostname that is different from the first hostname; and/or 3) restoring the target computing device using the selected source backup and configuring the target computing device with a second hostname that is different from the first hostname and a second network address that is different from the first network address.

The processor may then be configured to restore the target computing over the computer network device according to the selected disaster recovery option.

In one embodiment, the processor, memory and interface may be elements of a NAS. In one embodiment, the processor, memory and interface may be elements of a remote server or a remote web service accessible over a computer network.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of performing a disaster recovery restore process on a target computing device, the computer-implemented method comprising:
    accessing, by the target computing device over a computer network, a backup service;
    selecting, by the target computing device, a source backup from the backup service, the source backup comprising at least one volume of a source computing device from which the source backup was created, the source computing device being associated with a first hostname and a first network address;
    selecting, by the target computing device, one of a plurality of available disaster recovery options, the plurality of available disaster recovery options comprising at least two of:
        (i) restoring the target computing device using the selected source backup and configuring the target computing device with the first hostname and the first network address;
        (ii) restoring the target computing device using the selected source backup and configuring the target computing device with the first hostname and a second network address that is different from the first network address;
        (iii) restoring the target computing device using the selected source backup and configuring the target computing device with the first network address and a second hostname that is different from the first hostname; and
        (iv) restoring the target computing device using the selected source backup and configuring the target computing device with a second hostname that is different from the first hostname and a second network address that is different from the first network address; and
    restoring the target computing device according to the selected disaster recovery option.

2. The computer-implemented method of claim 1, further comprising rebooting the target computing device to complete the disaster recovery restore process on the target computing device.

3. The computer-implemented method of claim 2, wherein rebooting comprises rebooting the target computing device a single time to complete the disaster recovery restore process.

4. The computer-implemented method of claim 1, wherein at least one of the plurality of disaster recovery options comprises configuring the restored target computer for automatic backup with the backup service.

5. The computer-implemented method of claim 1, wherein at least one of the plurality of disaster recovery options comprises configuring the restored target computing device for automated backup with the backup service at restore time.

6. The computer-implemented method of claim 1, wherein selecting disaster recovery option (i) allows the source backup to be changed according to changes to the restored target computing device.

7. The computer-implemented method of claim 1, wherein selecting disaster recovery options (ii), (iii) or (iv) preserves unchanged the source backup in the backup service.

8. The computer-implemented method of claim 1, wherein selecting one of a plurality of available disaster recovery options is performed at restore time.

9. The computer-implemented method of claim 1, further comprising presenting credentials to the backup service before selecting a source backup from the backup service.

10. The computer-implemented method of claim 1, wherein selecting a source backup from the backup service further comprises:
    selecting at least one volume from the source backup; and
    restoring the selected at least one volume of the target computing device according to the selected disaster recovery option.

11. The computer-implemented method of claim 1, wherein at least the target computing device comprises a version of Microsoft Windows® 7 or above.

12. The computer-implemented method of claim 1, wherein selecting one of a plurality of available disaster recovery options is performed based upon user input.

13. A non-transitory machine-readable medium having data stored thereon representing sequences of instructions which, when executed by a target computing device, cause the target computing device to:
    access, over a computer network, a backup service;
    select a source backup from the backup service, the source backup comprising at least one volume of a source computing device from which the source backup was created, the source computing device being associated with a first hostname and a first Internet Protocol (IP) address;
    select one of a plurality of available disaster recovery options, the plurality of available disaster recovery options comprising at least two of:
        (i) restore a target computing device using the selected source backup and configure the target computing device with the first hostname and the first IP address;
        (ii) restore the target computing device using the selected source backup and configure the target computing device with the first hostname and a second IP address that is different from the first IP address;
        (iii) restore the target computing device using the selected source backup and configure the target computing device with the first IP address and a second hostname that is different from the first hostname; and (iv) restore the target computing device using the selected source backup and configure the target computing device with a second hostname that is different from the first hostname and a second IP address that is different from the first IP address; and restore the target computing device according to the selected disaster recovery option.

14. The non-transitory machine-readable medium of claim 13, wherein the sequences of instructions further cause the target computing device to reboot to complete the disaster recovery restore process on the target computing device.

15. The non-transitory machine-readable medium of claim 14, wherein rebooting comprises rebooting the target computing device a single time to complete the disaster recovery restore process.

16. The non-transitory machine-readable medium of claim 13, wherein at least one of the plurality of disaster recovery options comprises configuring the restored target computer for automatic backup with the backup service.

17. The non-transitory machine-readable medium of claim 13, wherein at least one of the plurality of disaster recovery options comprises configuring the restored target computing device for automated backup with the backup service at restore time.

18. The non-transitory machine-readable medium of claim 13, wherein selecting disaster recovery option (i) allows the source backup to be changed according to changes to the restored target computing device.

19. The non-transitory machine-readable medium of claim 13, wherein selecting disaster recovery options (ii), (iii) or (iv) preserves unchanged the source backup in the backup service.

20. The non-transitory machine-readable medium of claim 13, wherein selecting one of a plurality of available disaster recovery options is performed at least one of at restore time and based upon user input.

21. The non-transitory machine-readable medium of claim 13, wherein the sequences of instructions further cause the computing device to present credentials to the backup service before selecting a source backup from the backup service.

22. The non-transitory machine-readable medium of claim 13, wherein selecting a source backup from the backup service further comprises:

selecting at least one volume from the source backup; and restoring the selected at least one volume of the target computing device according to the selected disaster recovery option.

23. The non-transitory machine-readable medium of claim 13, wherein at least the target computing device comprises a version of Microsoft Windows® 7 or above.

24. A backup server for performing a disaster recovery restore process on a target computing device, the backup server comprising:

a processor;

a memory coupled to the processor, the memory being configured to store a plurality of source backups, each of the plurality of source backup comprising at least one volume of a source computing device from which the source backup was created, the source computing device being associated with a first hostname and a first Internet Protocol (IP) address; and an interface coupled to the processor, the interface being configured to receive, from a target computing device over a computer network, a selected one of a plurality of available disaster recovery options, the plurality of available disaster recovery options comprising at least two of:

(i) restore a target computing device using the selected source backup and configure the target computing device with the first hostname and the first IP address;

(ii) restore the target computing device using the selected source backup and configure the target computing device with the first hostname and a second IP address that is different from the first IP address;

(iii) restore the target computing device using the selected source backup and configure the target computing device with the first IP address and a second hostname that is different from the first hostname; and (iv) restore the target computing device using the selected source backup and configure the target computing device with a second hostname that is different from the first hostname and a second IP address that is different from the first IP address;

wherein the processor is configured to restore the target computing device over the computer network according to the selected disaster recovery option.

25. The backup server of claim 24, wherein the processor, memory and interface are elements of a Network Attached Storage (NAS) device.

26. The backup server of claim 24, wherein the processor, memory and interface are elements of a remote server or a remote web service.

* * * * *